United States Patent

Spector

[15] 3,707,287
[45] Dec. 26, 1972

[54] COLOR FAMILIARIZATION GAME

[72] Inventor: Berdine E. Spector, 67 Wyllys Street, Manchester, Conn. 06040

[22] Filed: July 28, 1971

[21] Appl. No.: 166,707

[52] U.S. Cl. .............................273/157 R, 35/35 H
[51] Int. Cl. ..............................................A63f 9/10
[58] Field of Search .273/156, 157 R, 157 A; 35/9 R, 35/35 H, 69, 70, 71, 72, 73

[56] References Cited

UNITED STATES PATENTS

| | | | |
|---|---|---|---|
| 777,268 | 12/1904 | Thompson | 35/70 UX |
| 1,359,646 | 11/1920 | Zion | 35/35 H UX |
| 1,656,030 | 1/1928 | Waring | 35/9 R X |
| 3,171,214 | 3/1965 | Sutherland | 273/157 R X |
| 3,302,310 | 2/1967 | Leven | 273/156 X |

*Primary Examiner*—Anton O. Oechsle
*Attorney*—WOlf, Greenfield & Sacks

[57] ABSTRACT

A game for young children for familiarizing them with colors and their word names, including a board and cover, the board being divided into parallel rows of boxes of different color, and a plurality of matching pairs of puzzle sets with the pieces of the pairs being physically interchangeable. One piece of each set is color coded to one of the boxes, and all of the pieces of each set bear the name of the particular color. When the pieces are assembled on the board in proper relation to the boxes and then inverted, a picture on the back of the assembled pieces serves as a proof that the pieces have in fact been properly assembled.

9 Claims, 3 Drawing Figures

PATENTED DEC 26 1972　　　　　　　　　　　　　　　3,707,287

INVENTOR
BERDINE E. SPECTOR
BY Wolf, Greenfield & Sacks

ATTORNEYS

COLOR FAMILIARIZATION GAME

This invention relates to games, and more particularly comprises a new and improved game designed for young children to familiarize them with colors and the printed names of the colors.

The game is in the form of a puzzle intended to be assembled on a board of a particular configuration and bearing selected indicia and requires the child playing the game to discriminate between colors and color words. The game includes means by which the child may prove that he has identified the colors and color names correctly as well as correctly assembled the several puzzle pieces, so that without any assistance from others the child can establish that he has or has not learned the colors and color words used. Thus the child can work independently and learn through play.

In a preferred form of the invention, the pieces of the puzzle as well as the board upon which the pieces are assembled are quite large to accommodate the motor coordination anticipated in young children.

Unlike conventional puzzles designed for children, the puzzle pieces of this invention are so conformed that the youngster may make different responses and still assemble the various puzzle pieces together. While there is only one correct response, alternative responses are available which nevertheless allow the child to complete the puzzle assembly.

The several objects and features of this invention alluded to above will be better understood and appreciated from the following detailed description of one embodiment thereof, selected for purposes of illustration and shown in the accompanying drawing in which.

Figure 1:
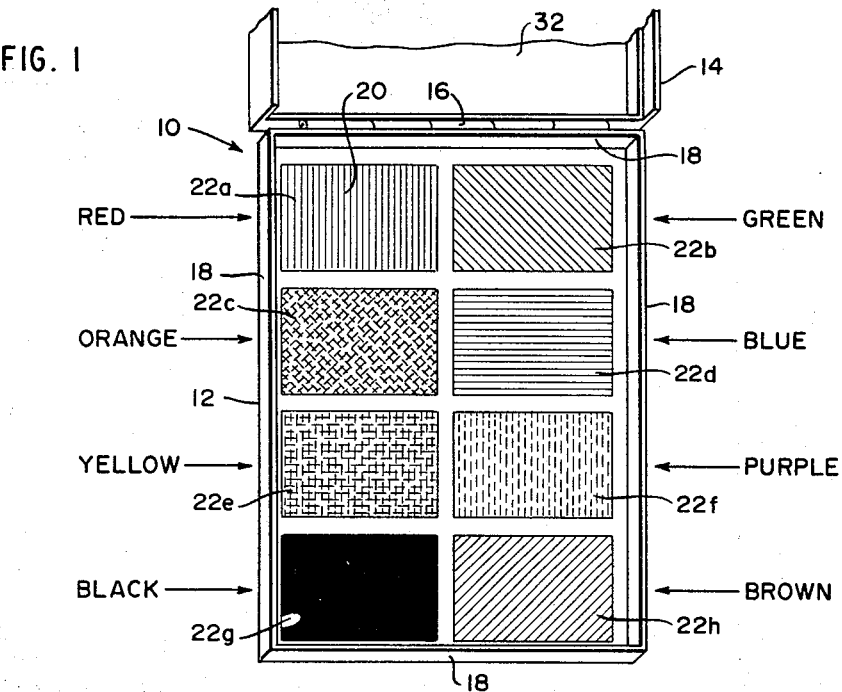
FIG. 1 is an isometric view of the board and cover of the game, partly broken away, with the cover shown in an open position to expose the surface of the board.

In the drawing a box 10 is shown comprising a tray or bottom 12 and a cover 14. As shown, the cover and tray are connected by a hinge 16 which allows the cover to be fully open and lie flat on the same surface as the tray 12. It is to be understood, however, that the tray and cover need not be hinged together.

In the preferred form, the tray 12 is provided with a circumferential side wall 18 about its four sides, and the bottom wall 20 is flat to provide a playing board for the game of this invention. The game also includes a number of puzzle pieces shown assembled together in FIG. 2, and it will be appreciated that the box 10 may serve as a container for the puzzle pieces when the game is not in use.

The board 20 of the tray is subdivided by colors into eight rectangular boxes, all of the same size, and each of the boxes is of a color distinct from the others. Thus, in FIG. 1 the board 20 is shown to have eight boxes 22a to 22h which are respectively colored red, green, orange, blue, yellow, purple, black and brown. The eight boxes are aligned in two columns of four, and in the preferred form the color boxes do not bear the word names of the colors.

Figure 2:
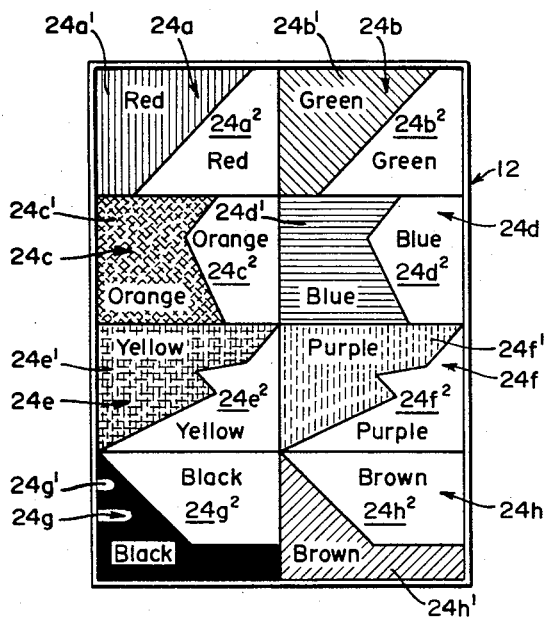
FIG. 2 is a plan view of the board shown in FIG. 1 with the various puzzle pieces assembled on it.

The puzzle pieces shown assembled in FIG. 2 comprise 16 in number, intended to be assembled in 8 pairs or sets. The 8 sets are respectively identified in FIG. 2 by numbers 24a to 24h, and one piece of each set is colored to correspond to the color of one box of the board 20. That is, piece 24a' of set 24a is colored red to correspond to the box 22a on the board 20, piece 24b' is green to correspond to box 22b on board 20 . . . and piece 24h' is brown to correspond to box 22h. Each of the colored pieces 24a' to 24h' also bears the name of its color.

It will also be noted in FIG. 2 that the adjacent sets of pieces 24a and 24b, 24c and 24d, 24e and 24f, and 24g and 24h are comprised of pieces which are identical in shape, i.e. 24a' and 24b', and 24y' and 24h'. Similarly, the white pieces of adjacent sets are identical, i.e., $24a^2$ and $24b^2$, $24c^2$ and $24d^2$ etc.

The front faces of all the pieces bear the name of the color of the colored piece in their respective sets. Consequently, in assembling the pieces of each set, the child not only has as a guide the puzzle piece shapes, but the names of the colors as well. Thus, for example while either piece $24a^2$ and $24b^2$ may be assembled with piece 24a', the names of the colors on the pieces indicate to the youngster that $24a^2$ properly mates with the piece 24a' and not piece $24b^2$.

In assembling the several puzzle pieces, the child matches up the various colored puzzle pieces with the corresponding blocks on the board 20, relying upon the color coding of the blocks and pieces to identify the related parts. Thereafter, the child associates the white piece with the other piece in its set both by the shapes of the pieces and the names of the colors which appear on them. The names of the colors which appear on the pieces serve as a guide so that the youngster will assemble the pieces with their top edges uppermost.

Figure 3:
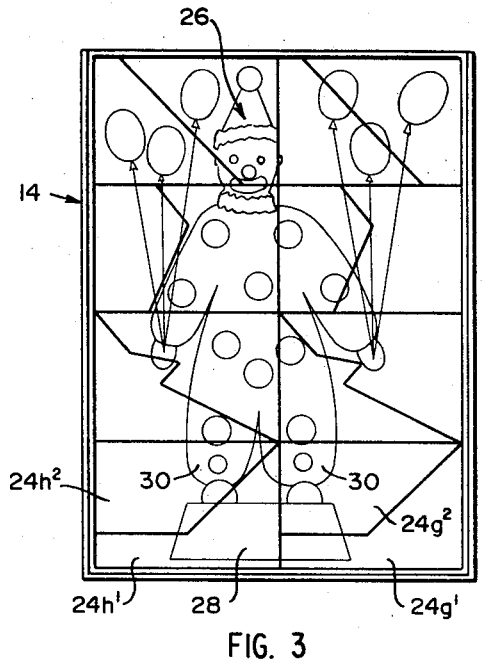
FIG. 3 is an inverted view of the various puzzle pieces showing the manner in which the solution of the game is proved.

A design or picture 26 is carried on the backs of the puzzle pieces, which serves as a proof for the child that the pieces have been assembled correctly. In FIG. 3 the pieces are shown upside down in their properly assembled position, and the images on the backs of the various pieces together depict a clown. Obviously, if the several pieces are not assembled properly, the clown will be disfigured. For example, if the youngster reversed pieces $24g^2$ and $24h^2$, the pedestal 28 and feet 30 of the clown would not be assembled properly. In order to examine the backs of the pieces while they remain assembled so as to prove the correctness of the solution of the puzzle, the youngster need only close the box with the pieces on the board 20, turn the box upside down, and again open the box with its cover down. The several puzzle pieces will remain in their assembled relation on the inner surface 32 of the cover, and the image will be plainly visible. In order to assure that the pieces do not become scrambled when the box is inverted, the distance between the supporting surface of the board 20 and surface 32 of the cover may be less than twice the thickness of the puzzle pieces. With that limited space, the pieces will not be able to shift laterally with respect to one another and become disarranged.

While I have suggested that to examine the backs of the puzzle pieces the box should be inverted and then again opened, it is apparent that the picture on the backs of the pieces could also be examined by making the board 20 of a translucent material. With such an arrangement the backs of the puzzle pieces could be viewed through the board.

It will be apparent that the game is designed to familiarize young children both with colors and the printed word. The game allows the child to work independently, it is self correcting, and enables the child to learn through play.

I claim:

1. A game comprising
a tray and cover,
at least two adjacent columns of colored boxes carried on the tray and defining the game board,
a plurality of sets of puzzle pieces with a piece of each set color coded to one of the boxes,
each set of pieces having a matching set of pieces with the pieces of the matched sets being respectively identically shaped,
markings carried by each piece in each set to distinguish the pieces of each set from the pieces of the other sets,
part of a picture carried on the back of each piece in each set with the picture parts cooperating to produce a unitary picture when all the pieces of the sets are assembled on the corresponding boxes to which a piece of each set is color coded.

2. A game comprising
a playing surface,
at least one matching pair of puzzle sets the pieces of which are respectively identically shaped and which, may be interchangeably assembled to form identical shapes,
a number of areas denoted on the playing surface, each of which corresponds in shape to the shape of an assembled set,
a first coding which visually links at least one piece in each set with one particular denoted area,
and coding means which links the pieces in the respective sets,
and a pattern carried on the backs of all the pieces which indicates that all the pieces are assembled in a prescribed relationship when the pieces are inverted.

3. A game as described in claim 2 further characterized by
said areas being arranged in parallel rows equal in number to the number of pairs of sets,
and the paired sets of pieces being coded to adjacent areas in the separate parallel rows.

4. A game as described in claim 2 further characterized by
means operatively associated with the surface to facilitate inversion of all the pieces of the sets simultaneously to expose their backs.

5. A game as described in claim 3 further characterized by
each area bearing a separate color coding, and the piece in each set coded to the respective area bearing the same color.

6. A game as described in claim 5 further characterized by
the coding means linking the pieces of each set being a color coding.

7. A game as described in claim 6 further characterized by
all of the pieces of each set being color coded by each bearing the name of the same color.

8. A game as described in claim 6 further characterized by
means operatively associated with the surface to facilitate inversion of all the pieces of the sets simultaneously to expose their backs.

9. A game comprising
a playing board and a cover,
two parallel columns of boxes all of the same size defined on the board with each box bearing its own distinctive color different from the colors of all the other boxes,
a plurality of matching pairs of puzzle sets with the pieces of the matching pairs being physically interchangeable but non-interchangeable with the pieces in the other sets,
the number of sets of pieces being identical to the number of boxes, and the sets when assembled being the same shape as the boxes on the playing board and designed to be assembled on the board,
one piece in each set bearing the same color as the color of one box and all the pieces of each set bearing the name of the color, said color and names of the colors appearing on the top face of each piece to guide in the assembling of all the sets on their corresponding colored boxes,
and a pattern carried on the back of each piece and cooperating with pattern on the other pieces to indicate that the pieces are assembled properly with respect to one another and to the board when the pieces are inverted on the cover.

* * * * *